United States Patent [19]

Popalis

[11] Patent Number: 4,820,476
[45] Date of Patent: Apr. 11, 1989

[54] SYSTEM AND METHOD FOR PLUGGING THE CORE BARREL OF A NUCLEAR REACTOR

[75] Inventor: Craig H. Popalis, Pensacola, Fla.
[73] Assignee: Westinghouse Electric Corp., Pittsburgh, Pa.
[21] Appl. No.: 19,759
[22] Filed: Feb. 27, 1987
[51] Int. Cl.$^4$ .............................................. G21C 13/06
[52] U.S. Cl. ................................... 376/203; 220/238; 220/315; 220/DIG. 4; 376/400
[58] Field of Search ............... 376/203, 204, 399, 400; 220/233, 234, 238, 315, DIG. 4

[56] References Cited

U.S. PATENT DOCUMENTS

| | | | |
|---|---|---|---|
| 2,740,548 | 3/1956 | Schultz et al. | 220/238 |
| 3,635,370 | 1/1972 | Romanauskas | 220/315 |
| 3,653,410 | 4/1972 | West | 376/203 |
| 4,393,899 | 7/1983 | Tsuji et al. | 138/89 |
| 4,576,778 | 3/1986 | Ferree et al. | 376/203 |
| 4,591,068 | 5/1986 | Tolino et al. | 220/240 |
| 4,693,389 | 9/1987 | Kalen | 376/203 |

Primary Examiner—Deborah L. Kyle
Assistant Examiner—Richard W. Wendtland

[57] ABSTRACT

An improved plugging system for plugging chamfered flow ports of small diameters in the core barrel of a pressurized water nuclear reactor is disclosed herein. The system is comprised of improved core barrel plugs that are telescopically contractible to facilitate installation, as well as a handling tool having a compact hydraulic ram and plug-holding cradle that is easily manipulable in the limited access space between the core barrel and thermal shield of the reactor for inserting and expanding the plugs into sealing engagement with the core barrel flow ports. The plugs of the system are formed from a generally cylindrical plug body that is radially expandible, and a retaining ring that is telescopically engaged around the plug body which allows it to be slid toward the middle of the plug prior to installation in order to minimize the overall length of the plug prior to the insertion operation. The retaining ring is also slidably installable around the plug body to allow different-sized retaining rings to be installed around plug bodies in order to accommodate different-size port chamfers. Finally, both the hydraulic ram and the plug-holding cradle of the installation tool are movable within the frame of the tool, and co-act by way of a pivoting linkage to insert the plug completely into a selected flowport prior to the expansion of the plug within the port by the ram.

19 Claims, 6 Drawing Sheets

SYSTEM AND METHOD FOR PLUGGING THE CORE BARREL OF A NUCLEAR REACTOR

BACKGROUND OF THE INVENTION

1. Field of the Invention

This invention generally concerns a system and method for remotely plugging an opening in the wall of a vessel to which access is limited. It is specifically concerned with an improved system and method for plugging the flow ports of a core barrel in a pressurized water nuclear reactor which are closely surrounded by a thermal shield.

2. Discussion of the Prior Art

Devices for plugging the core barrels of pressurized water nuclear reactors are known in the prior art. Generally, such prior art devices are comprised of a plug body formed from a cylindrical shell that surrounds a tapered mandrel. One end of the shell is insertable into the mouth of a flow port, while the other end is circumscribed by an integrally formed retaining flange that controls the extent to which the cylindrical shell may be inserted into the port. A tapered mandrel axially movable within the cylindrical shell wedgingly engages tapered walls present in the interior of the shell when pushed therein in order to radially expand the shell into sealing engagement with the flow port, thereby plugging it. The tapered mandrels in such prior art plugging devices are pushed against the tapered walls in the interior of the cylindrical shell of the plug body by means of a pressurized hydraulic fluid. To this end, the plug body includes its own hydraulic chamber at its flanged end, and a nipple or other inlet means for admitting a hydraulic fluid. The tapered mandrel sealingly engages the interior walls of the shell so that when hydraulic fluid is admitted into the chamber present at the flanged end of the shell, the mandrel moves piston-like toward the end of the shell, thereby expanding it.

Such plugging mechanisms are very useful in converting the coolant flow in a reactor vessel from a downflow pattern to an upflow pattern. However, before the overall purpose and utility of such plugging mechanisms may be fully appreciated, a brief discussion of the significance of the upflow conversion of the reactor vessel internals is necessary.

Conventional pressurized water reactors include a reactor vessel having a core barrel disposed therein that produces heat by means of a plurality of nuclear fuel rod assemblies. A water coolant is circulated through the core barrel and in heat transfer relationship with the nuclear fuel assemblies so that heat is transferred from the assemblies to the water coolant. The fuel assemblies are surrounded by an arrangement of vertical metal baffle plates that define the outer limits of the core barrel. Although the baffle plates are joined together to form an outer perimeter for the core barrel, these plates are bolted, rather than welded, together. Consequently, small gaps sometimes exist between two adjacent baffle plates. In some nuclear reactors, the particular path of the water coolant flowing through the core barrel creates a pressure differential which causes high pressure streams of coolant to squirt or "jet" through the gap between the baffle plates and into the core barrel. These streams of coolant will sometimes impinge on the relatively delicate fuel rods contained in the fuel rod assemblies, and cause them to rattle against their support grids. Such rattling may damage and ultimately break the delicate fuel rods, thereby contaminating the water coolant within the core barrel with particles of radioactive uranium oxide.

One particularly successful solution to the problems caused by such coolant "jetting" is disclosed in U.S. Pat. Nos. 4,576,778 and 4,591,068, both of which are assigned to the Westinghouse Electric Corporation. In this solution, the flow ports present in the walls of the core barrel of the reactor are plugged, thereby converting the reactor from a by-pass downflow configuration to a by-pass upflow configuration (see FIGS. 1 and 2). Each of these patents discloses plugging mechanisms that are used to implement such a flowpath conversion in the reactor core by plugging the flowports that normally exist in the walls of the core barrel.

Unfortunately, such prior art plugging mechanisms are not readily usable in all core barrel designs. For example, in some core barrels, the flowports include a broadly chamfered portion that leads into a small diameter opening. Such chamfered, small-diameter flowports are difficult to plug with existing plug mechanisms for three reasons. First, the plug bodies are too short to be inserted deeply enough past the chamfer to create a good sealing engagement between the distal end of the plug body, and the non-chamfered portion of the flowport. However, if one attempts to solve this problem by merely elongating the plug body, insertion into the flowport prior to the expansion of the plug body becomes difficult, if not impossible, due to the mechanical interference created by the thermal shield that is spaced a very short distance away from the chamfered portion of the flowport. A second problem is created by the relatively small diameter of the non-chamfered portion of the port. If one attempts to scale down the diameter of the pressure chamber within the plug body to accommodate the relatively smaller diameter of such flowports, the hydraulic pressures necessary to drive the tapered mandrel into wedging engagement against the tapered inner walls of the cylindrical shell become high enough to subject the inside of the plug body to unacceptably high levels of mechanical stress. The third difficulty results from the fact that both the diameter and the depth of the chamfered portions of such flowports vary. Hence, no single-sized plugging mechanism is capable of adequately plugging all of the different-sized flowports present in such core barrels.

Clearly, what is needed is an improved plugging system whose plugs may be easily manipulated in the limited access space between the core barrel and the thermal shield and readily inserted and expanded into a particular flowport. Ideally, such a plugging system should be capable of installing plugs in flowports having chamfered portions of different diameters and different depths. Finally, such an improved system should be capable of reliably plugging flow holes of relatively small diameter without the creation of unacceptably high levels of mechanical stress within the plug body.

SUMMARY OF THE INVENTION

Generally speaking, the invention is an improved plugging system and method for remotely plugging ports in the wall of a vessel, such as the core barrel of a pressurized water nuclear reactor. It is particularly well adapted for plugging ports which include a chamfered portion that leads to the outer surface of the vessel, and a non-chamfered cylindrical portion that leads to the inner surface of the vessel, wherein access is impeded to the ports by the presence of a wall closely spaced to the entrance of the port, such as the thermal shield that closely circumscribes the outer surface of a core barrel.

The plugging system of the invention may include a length-contractible plug that is manipulable in the limited space between the core barrel and thermal shield, insertable through the chamfered portion of a selected port, and expandable into the non-chamfered portion of the port. The plug may include a plug body having a distal end receivable within the non-chamfered portion of the port and radially expandable into sealing engagement therewith, and a proximal end that includes a retaining ring that circumscribes the plug body and is telescopically connected thereto. The retaining ring may function to engage the surface of the vessel wall surrounding the chamfered end of the port and thereby to limit the extent to which the plug body is received into the non-chamfered portion of the port.

In operation, the retaining ring is preferably slid toward the middle of the plug body to contract the over-all length of the plug prior to the insertion of the plug body into the port, thereby allowing the plug to be manipulated into the limited space between the core barrel and thermal shield prior to installation. The retaining ring is preferably slidably installable around the plug body, and the system of the invention may further include a plurality of retaining rings having differing outer diameters to accommodate chamfers of different diameters of different ports. By contrast, the outer diameters of each of the plug bodies in the system are substantially uniform, so that any plug body may be used to assemble a plug with any of the different diametered retaining rings. In the preferred embodiment, each of the retaining rings includes a concentrically disposed opening for receiving the cylindrical, distal end of any of the plug bodies, while the proximal end of each of the plug bodies includes a stop flange that engages against the retaining ring when the plug body is telescopically slid through the retaining ring into its final sealing position.

The plug body may include a cylindrical shell characterized by tapered internal walls, as well as a tapered mandrel disposed therein for wedgingly engaging and radially expanding the tapered walls when a pushing force is applied to the mandrel. The plug body may also include a locking mechanism for preventing overexpansion of the body within the non-chamfered portion of its respective port, and this locking mechanism may further have an indicator means in the form of an extensible pin for indicating when the plug body has been sufficiently expanded to sealingly engage its respective port.

Finally, the system may include an installation tool that includes a frame connected to a long handle, a compact hydraulic ram, a cradle assembly for detachably holding one end of a plug, and a linkage movably connecting the cradle assembly to the frame so that the cradle may move out of the front end of the frame. The compact hydraulic ram is slidably movable within the frame and is capable of moving behind and displacing the cradle assembly and plug out of the front of the frame.

In the method of the invention, the outer diameter of the chamfered portion of a port to be plugged is ascertained, and a suitable plug is assembled by inserting the distal end of a plug body through the concentrically disposed opening in a retaining ring having an outer diameter that is greater than the outer diameter of the chamfered portion. To facilitate the insertion of the plug into the port, the retaining ring is slid toward the middle of the plug body in order to minimize the overall length of the plug prior to the insertion operation. The hydraulic ram of the installation tool is then slid behind the carriage assembly, thereby extending the plug completely into the port. The pistons of the ram are then used to push the tapered mandrel of the plug body into wedging engagement against the tapered walls of the cylindrical shell in order to expand the shell walls into sealing engagement around the non-chamfered portion of the bore. The installation tool is then removed, and the operation is repeated until all of the ports in the core barrel are plugged.

DETAILED DESCRIPTION OF THE PREFERRED EMBODIMENT

General Overview of the Purpose, Structure, and Function of the Invention

Figure 1:
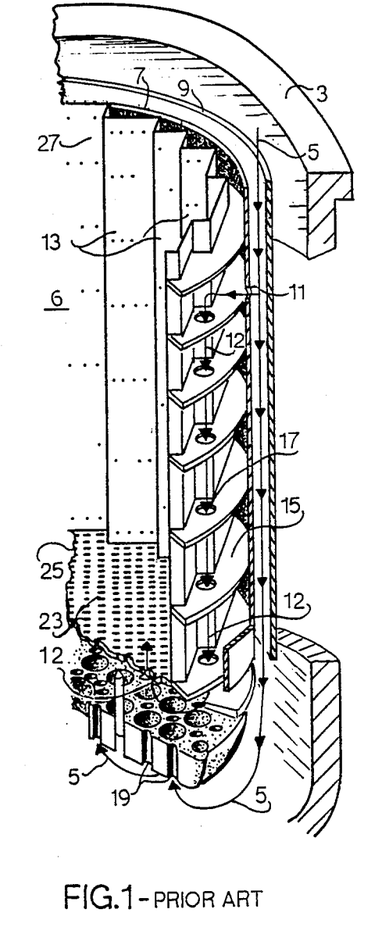
FIG. 1 is a partial perspective view of a reactor core, illustrating the flowpath of a coolant through a conventional core barrel.
Figure 2:
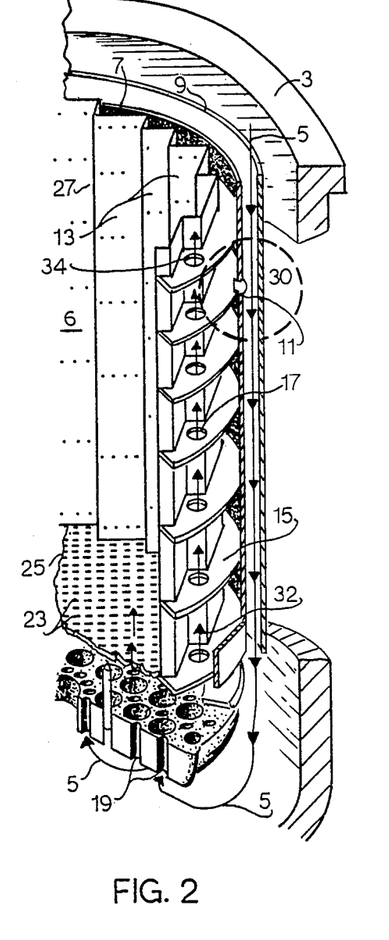
FIG. 2 is a partial perspective view of the core of a nuclear reactor in which the flowpath of the coolant has been modified from a downflow to an upflow configuration by plugging the flowports in the core barrel.
Figure 3:
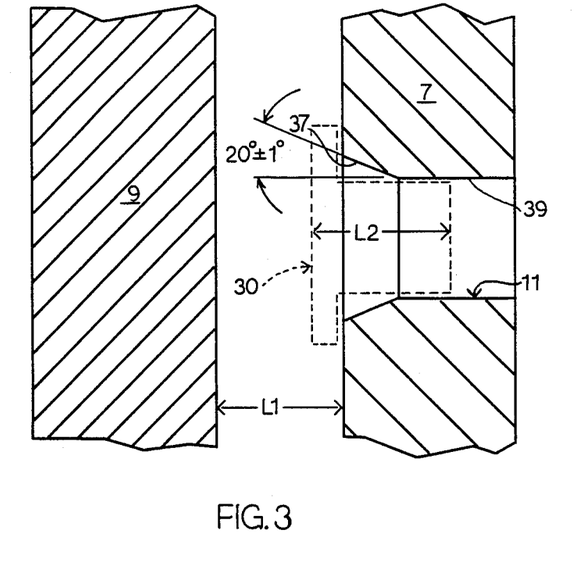
FIG. 3 is an enlarged cross-sectional side view of the flowport in the core barrel, illustrating the small amount of access space existing between the chamfered portion of the port and the thermal shield of the reactor core.

With reference to FIGS. 1, 2, and 3, wherein like numerals denote like parts, the system of the invention is particularly adapted for modifying the flow of coolant through the core 1 of a nuclear reactor. In such reactors, core 1 generally includes a reactor vessel 3 having a coolant inflow path (not shown) for introducing a flow 5 of liquid coolant through the interior 6 of a core barrel 7 that contains a plurality of nuclear fuel assemblies (also not shown). In most instances, this coolant is water pressurized to about 2,250 psi. The exterior of the core barrel 7 is circumscribed by a cylindrical thermal shield 9 as shown. As is indicated by the flow arrows 5, pressurized water is directed downwardly in the annular space between the core barrel 7, and the thermal shield 9. Much of this flow goes completely through the annular space defined between the core barrel 7 and the thermal shield 9, where it impinges against the bowlshaped bottom of the reactor vessel 3, and is ultimately directed upwardly through the interior 6 of the core barrel 7. However, a set of lateral flowports 11 that circumscribe the core barrel 7 direct a portion 12 of the downflow 5 toward an array of baffle plates 13 that circumscribe the barrel interior 6. These baffle plates 13 are circumscribed by a series of uniformly spaced former plates 15 into which a set of mutually aligned flowports 17 are bored. These flowports 17 in the former plates 15 direct the branch downflow 12 of the coolant downwardly toward the lower core plate 21. After impinging on the top surface of the lower core plate 21, the branch downflow 12 loops upwardly and flows through the apertures 23 of a lower baffle plate 25 spaced above the lower core plate 21. At the same time, the main flow 5 impinges off of the bowlshaped interior surface of the reactor vessel 3, and ultimately flows through the flowports 19 of the lower core plate 21. The two streams of coolant 5 and 12 unite in the space between the lower core plate 21 and the lower baffle plate 25, and flow upwardly through the fuel assemblies disposed in the interior 6 of the core barrel 7.

The configuration of baffle plates 13 is comprised of a plurality of abutting plates which are held adjacent to the inner wall of the core barrel 7. These plates 13 are only bolted together along their corners 27. Because there is no fluid seal between the abutting baffle plates 13, high-pressure jets of coolant can squirt out between them as a result of the pressure differential which exists between the branch downflow 12 of coolant on the outside surface of the baffle plates 13 from the lateral flowports 11, and the upflowing coolant on the inside surface of the baffle plates 13. These high-pressure jets can impinge on the relatively fragile fuel rods in the fuel rod assemblies and damage them by rattling them against their retaining grids.

The purpose of the system of the invention is to eliminate these high-pressure jets of coolant by modifying the conventional "downflow" coolant path illustrated in FIG. 1 to the "upflow" coolant path illustrated in FIG. 2. To this end, two structural modifications to the reactor core 1 are made. First, all of the lateral flowports 11 of the core barrel 7 are plugged. Such plugging causes all of the coolant flow 5 to flow downwardly between the inside of the reactor vessel 3 and the outside of the thermal shield 9 and back up through and around the lower core plate 21. While most of the coolant flow 5 travels through the flowports 19 of the lower core plate 21 and up through the lower baffle plate 25 as previously described, a branch 32 of this flow travels upwardly through the ports 17 of the former plates 15. Second, in order to establish a coolant flowpath between the inside walls of core barrel 7 and the outside walls of the baffle plate 13 (which will minimize any pressure differential in the coolant flowing on both sides of the baffle plates 13), a plurality of fluid flowpaths in the form of bores 34 are made in the top former plate which overlies the gap between the core barrel 7 and the baffle plate 13.

As is illustrated in FIG. 3, some of the lateral flowports 11 that extend through the walls of the core barrel 7 include a chamfered portion 37 that leads into a round non-chamfered portion 39. The edge of the chamfered portion 37 is closely spaced a distance L1 from the inner surface of the thermal shield 9, which typically may be only 1.34 inches. Additionally, the length of the chamfer along the longitudinal axis of the lateral flowport 11 may be on the order of 0.06 inches. In order for a conventional plug to effectively seal such a chamfered flowport 11, the overall length L2 of the plug 30 would have to be approximately 1.5 inches. If the plug 30 were made any shorter, it would not extend sufficiently deep into the non-chamfered portion 39 of the port 11 to create a reliable fluid seal. However, as the overall length L2 of such a plug (i.e., 1.50 inches) is greater than the distance L1 (i.e., 1.34 inches) between the core barrel 7 and the thermal shield 9, the use of a prior art plug 30 in such a chamfered flowport 11 is clearly unfeasible. As is described in detail hereinafter, the invention solves this problem by means of an improved system that employs both a plug 40 that is telescopically contractible during installation, and an installation tool 110 that includes a compact hydraulic ram, and a movable carriage assembly for holding the plug 40 during installation.

Figure 4A:
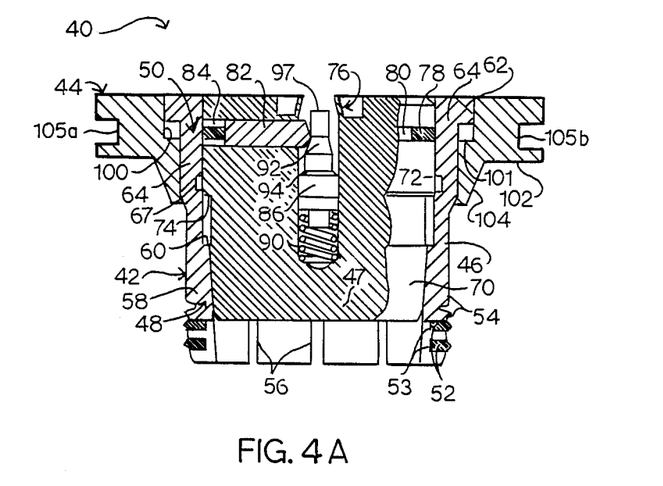
FIG. 4A is a partial cross-sectional side view of a plug used in the system of the invention.
Figure 4B:
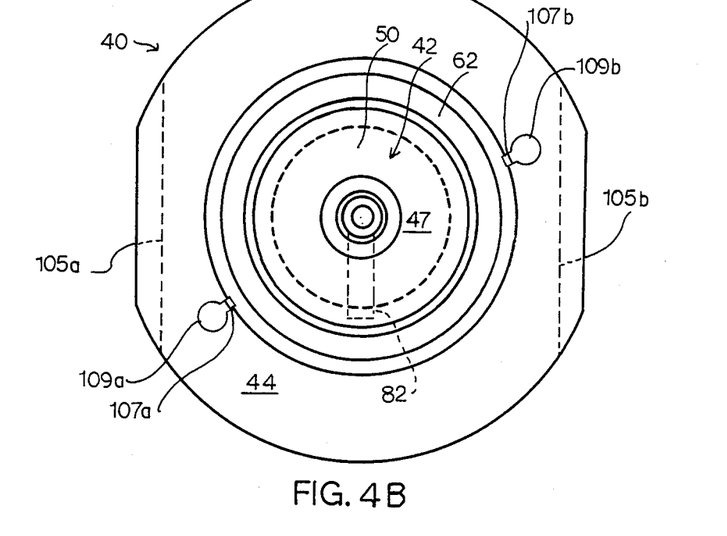
FIG. 4B is a plan view of the plug illustrated in FIG. 4A.
Figure 4C:
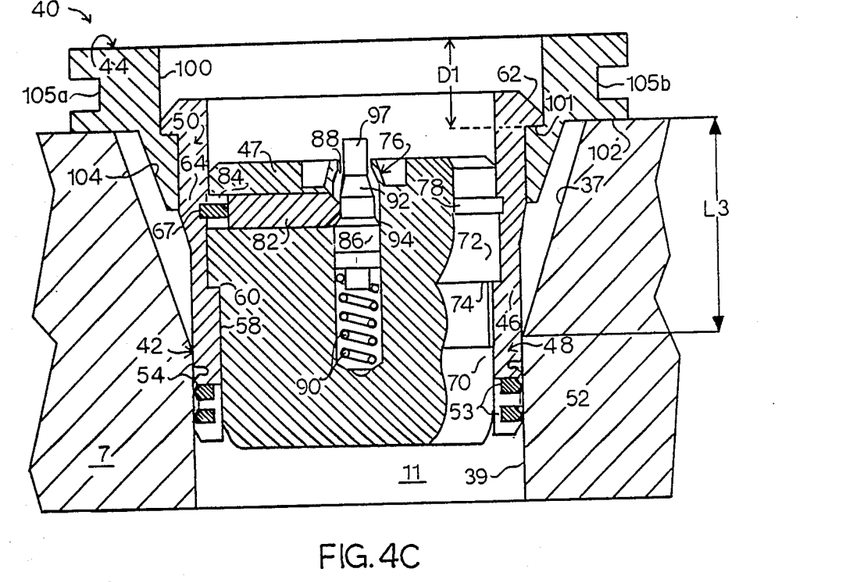
FIG. 4C is a partial cross-sectional side view of the plug of FIG. 4A as it would appear installed into the chamfered flowport of the core barrel.

Specific Description of the Plug and Installation Tool Used in the System and Method of the Invention With reference now to FIGS. 4A, 4B and 4C, the improved plug 40 of the invention is generally formed from a cylindrical plug body 42, and a retaining ring 44 that is telescopically engaged around this body.

The plug body 42 includes a cylindrical shell 46 having a tapered mandrel 47 disposed therein that serves to expand the cylindrical shell 46 into sealing engagement with a flowport 11. The distal end 48 of the shell 46 is insertable within the non-chamfered portion 39 of a flowport 11, while the proximal end 50 is circumscribed by the retaining ring 44 which limits the extent to which the distal end 48 may be so inserted. When the plug 40 is installed, the distal end 48 of the shell 46 is sealingly engaged around the non-chamfered portion 39 of the flowport 11, while the proximal end 50 is surrounded by (but not engaged to) the chamfered portion 37 of this flowport.

On its outside surface, the distal end 48 of the cylindrical shell 46 includes a pair of gripping rings 52 formed from age-hardened stainless steel that are seated within annular grooves 53. These gripping rings 52 are tapered along their outer edges, and indent into the inner diameter of the non-chamfered portion 39 of the flowport 11 when the plug body 42 is expanded, thus providing added retention capability against high coolant pressures which could act to dislodge the plug 40 during a postulated loss of coolant (LOCA) event. Disposed directly above the gripping rings 52 are a pair of annular sealing ribs 54 integrally formed into the wall of the shell 46. These sealing ribs deform into sealing engagement against the inner diameter of the non-chamfered portion 39 of the port 11 when the plug body 42 is expanded. Disposed below the gripping rings 52 are a plurality of axially oriented slots 56. These slots 56 facilitate the expansion of the distal end 48 of the cylindrical shell 6 when the tapered mandrel 47 is pushed therethrough. On its inside surface, the distal end 48 of the shell 46 includes a tapered wall section 58 that is generally complementary in shape to the distal end of the tapered mandrel 47. At its top end, the tapered wall 58 terminates in an annular stopping shoulder 60 which co-acts with the mandrel 47 in a manner which will be described in detail presently.

On its outside surface, top edge of the proximal end 50 of the cylindrical shell 46 is circumscribed by a stop flange 62. This flange 62 becomes telescopically engaged with the retaining ring 44 when the plug body 42 is slid completely through the ring in the position illustrated in FIGS. 4C and 5. The outside of the proximal end 50 of the cylindrical shell 46 further includes an enlarged wall portion 64 disposed directly beneath the stop flange 62. On its inside surface, the proximal end is circumscribed by an annular recess 67 for a purpose which will be described hereinafter.

The expansion mandrel 47 includes a distal tapered section 70 that wedgingly engages against and is complementary in shape to the tapered wall section 58 of the shell 46. The mandrel 47 also includes a cylindrical proximal section 72 that slidably engages against the inner cylindrical wall of the proximal end 50 of the shell 46. The distal end of the cylindrical proximal section 72 terminates in an annular retention shoulder 74 that is complementary in shape and engageable with the annular stopping shoulder 60 disposed about midway in the inside of the shell 46. Stopping shoulder 60 of the shell 46 and retention shoulder 74 of the mandrel 47 help to prevent the mandrel 47 from being pushed too far toward the distal end of the shell 46.

The mandrel 47 also includes a proximal cylindrical section 72 that is circumscribed by a locking mechanism 76. This locking mechanism 76 is formed in part by a C-shaped snap ring 78 that is seated within a C-shaped groove 80 around the proximal section 72 of the mandrel 47 as shown. When the mandrel 47 is pushed downwardly into the shell 46 in the position illustrated in FIG. 4C, the snap ring 78 (whose resiliency biases it radially outwardly) snaps into the previously discussed annular recess 67. The locking mechanism 76 also has a linking pin 82 that is slidably disposed within a radially oriented bore 84. The linking pin has a tapered distal end that engages a vertically disposed indicator pin 86, and a flat proximal end that abuts the snap ring 78. The purpose of the linking pin 82 is to trigger a vertical movement of the indicator pin 86 (which is slidably disposed within a bore 88) when the mandrel 47 is pushed into shell 46 in the position shown in FIG. 46. A spring 90 biases the indicator pin 86 upwardly. The snap ring 78 causes the linking pin 82 to apply a radially directed force against a tapered section 92 of the indicator pin 86 when the mandrel 47 is in the upward position illustrated in FIG. 4A. This radially directed force is sufficient to overcome the biasing force of the spring 90, so that the indicator pin 86 remains in the lower position illustrated in FIG. 4A so long as the mandrel 47 is not moved. However, when the mandrel 47 is pushed toward the proximal end 50 of the shell 46 so that its annular retention shoulder 74 becomes seated against the stopping shoulder 60, the snap ring 78 expands into the annular recess 67, thereby removing the radially directed force pushing the tapered end of the linking pin 82 into the tapered section 92 of the indicator pin 82. Consequently, the indicator pin 86 will pop axially upwardly in its bore 88 until its shoulder 95 (located immediately below its tapered section 92) engages the tapered end of the linking pin 82. This will result in the indicator head 97 of the indicator pin 86 rising above the outside surface of the tapered mandrel 47, thereby providing a visual signal to the system operator that the mandrel 47 has been moved to its maximum extent toward the proximal end 50 of the shell 46. As will be explained hereinafter, the indicator head 97 co-acts with an air valve stem 122 in the hydraulic ram 112 of the installation tool 110 to make an even more manifest visual signal.

The last principal component of the improved plug 40 of the invention is the retaining ring 44. In its interior, the retaining ring 44 includes a concentrically disposed, circular opening 100 for slidably receiving the proximal end 50 of the cylindrical shell 46 and plug body 42. The inner diameter of the opening 100 is defined by a retaining ledge 101 that engages the stop flange 62 of the plug body 42 when the plug is extended into a flow port 11. In its exterior, the ring 44 has an annular, wall-engaging face 102 that engages the portion of the outside surface of the core barrel 7 that circumscribes the chamfered portion 37 of the flowport 11. Immediately beneath the wall-engaging face 102 is a tapered shoulder 104 whose angle of taper is preferably about the same as the angle of taper of the chamfered portion 37. A pair of parallel, opposing handling grooves 105a, 105b are provided along the exterior of the retaining ring 44 in order to facilitate the gripping of the entire plug 40 by the installation tool 110. Finally, a pair of detents 107a, 107b are formed on the inner diameter of the opening 100 of the ring 44 by a pair of shallow bores 109a, 109b (as is best seen in FIG. 4B). These bores create a thin flange of metal adjacent to the edge of the opening 100 that can easily be bent inwardly. The resulting detents 107a, 107b prevent the ring 44 from sliding completely off of the shell 46 after the plug 40 is assembled.

Figure 5:
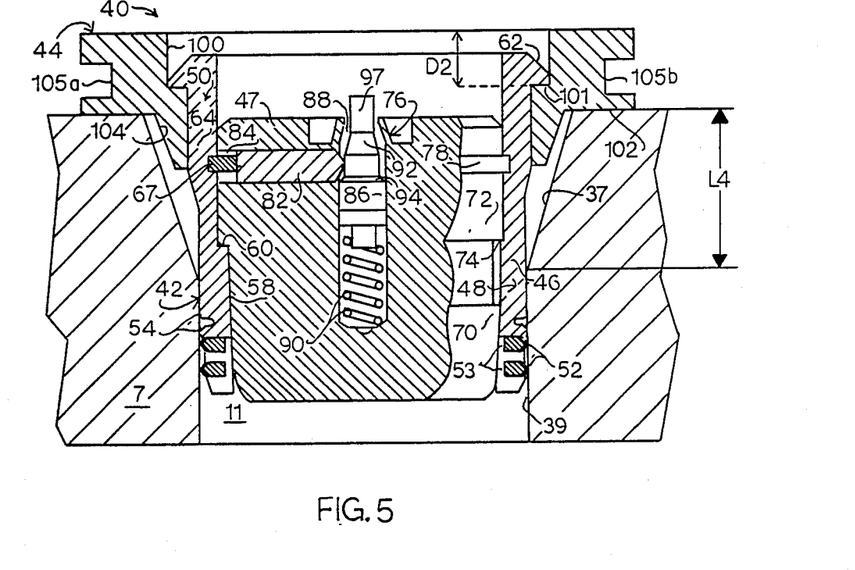
FIG. 5 is a partial cross-sectional side view of another embodiment of the plug of the invention which is particularly adapted for use in flowports having deep chamfered portions.

FIG. 5 illustrates a second embodiment of the plug 40 that is particularly well adapted for use in flowports 11 having relatively deep chamfered portions 37. In this embodiment, the retaining ledge 101 is moved downwardly along the longitudinal axis of the plug 40, and the tapered shoulder 104 is likewise extended in order to provide sufficient tensile strength to the telescopic fit between the stop flange 62, and the retaining ledge 101. Since the embodiment illustrated in FIG. 5 is in all other respects identical in structure to the embodiment illustrated in FIGS. 4A, 4B and 4C, no further discussion thereof is deemed necessary.

Figure 6A:
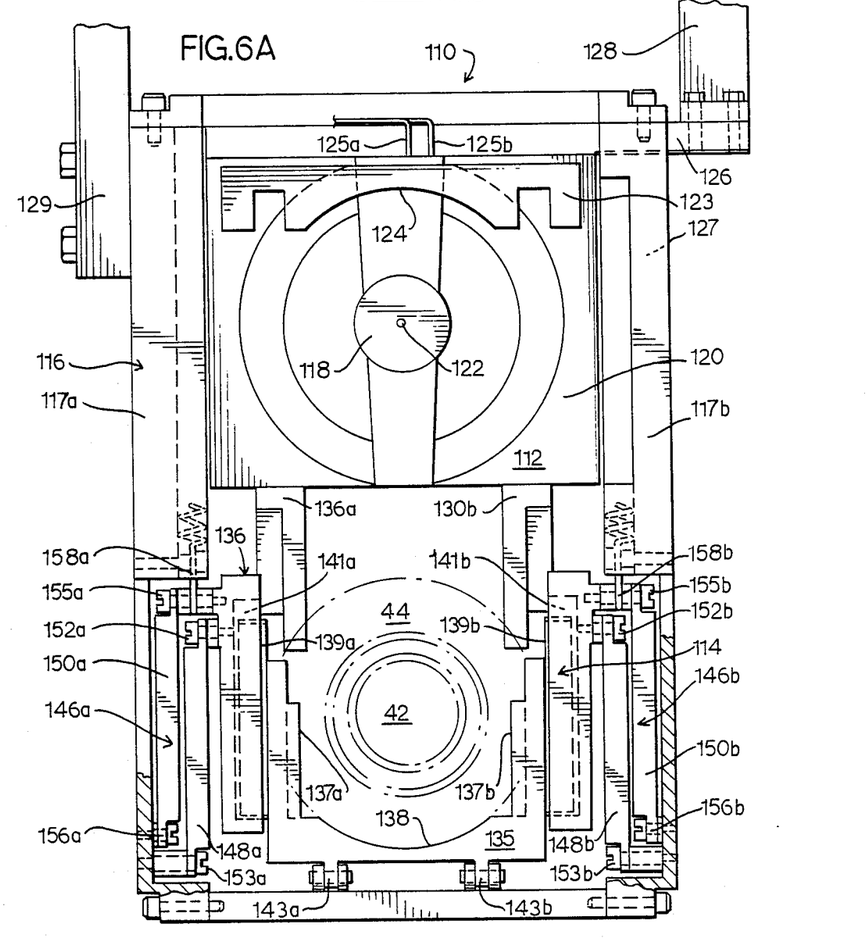
FIG. 6A is a front view of the installation tool of the system of the invention.
Figure 6B:
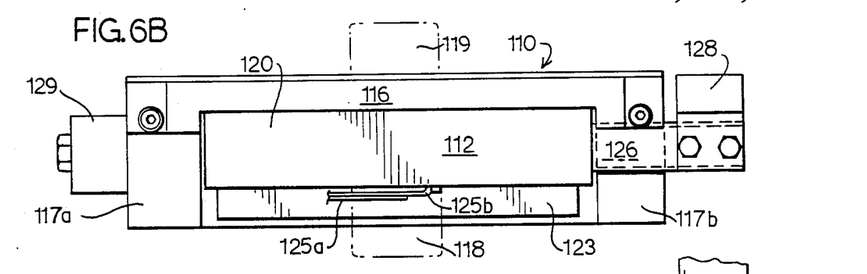
FIG. 6B is a top view of the installation tool shown in FIG. 6A.
Figure 7A:
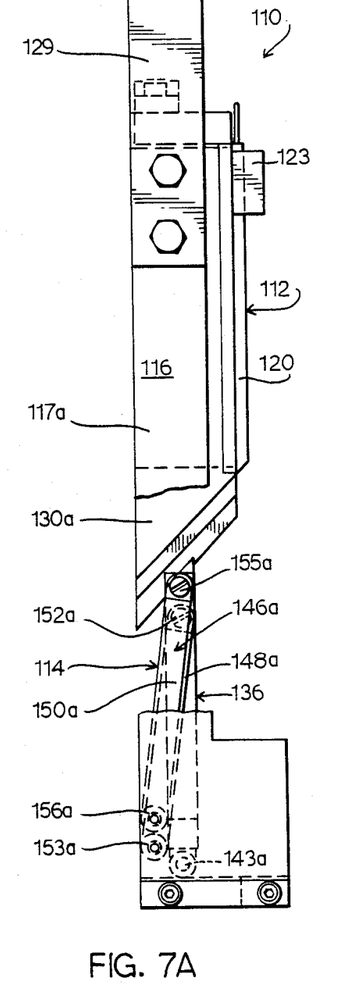
FIG. 7A is a side view of the installation tool with part of the frame broken away to show the camming action between the hydraulic ram and the cradle assembly.
Figure 7B:
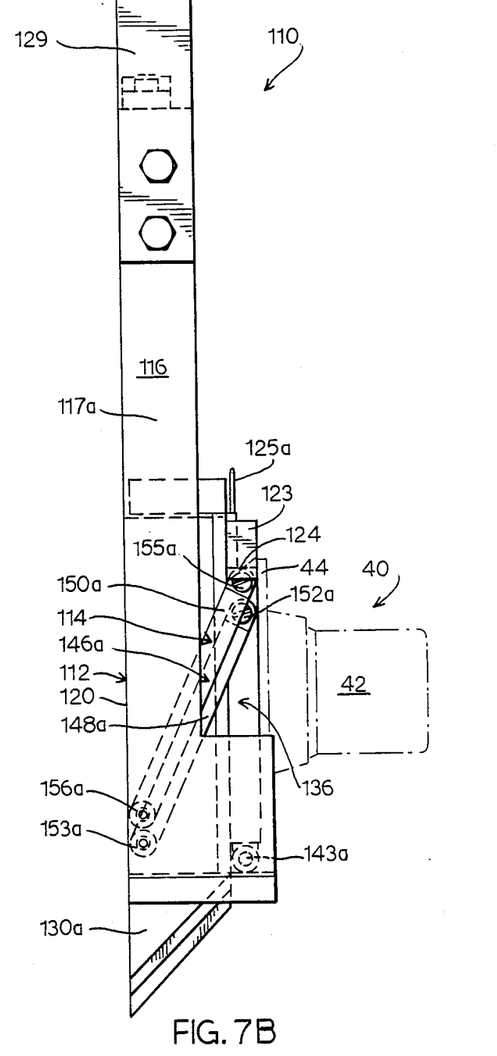
FIG. 7B is another side view of the installation tool, showing how the hydraulic ram may be slid downwardly behind the cradle assembly, thereby displacing it out of the front side of the frame.

With reference now to FIGS. 6A and 6B, the installation tool 110 of the system of the invention generally comprises a compact hydraulic ram 112 for pushing the mandrel 47 into the shell 46 of the plug 40, and a cradle assembly 114 for retaining the plug 40 during the plug insertion and expansion operation. As will be described in more detail presently, both the compact hydraulic ram 112 and cradle assembly 114 are movably mounted within a rectangular frame 116 having a pair of parallel side members 117a, 117b. Specifically, the hydraulic ram 112 is reciprocably movable along the vertical axis of the frame 116 between the side members 117a, 117b, while the cradle assembly 114 is pivotally movable out of the front of the frame 116 (see FIGS. 7A and 7B).

The compact hydraulic ram 112 includes a front piston 118 and a rear piston 119 which are telescopically interfitted within the square ram body 120. Concentrically disposed in the face of the front telescoping piston 118 is a spring-loaded air valve stem 122. In operation, the face of the telescoping piston 118 is concentrically aligned with the upper face of the tapered mandrel 47 so that when the mandrel 47 is pushed downwardly into the shell 46 by the combined action of the front and rear pistons 118, 119 reacting off of the thermal shield 9, the indicator head 97 of the indicator pin 86 pops up against the air valve stem 122. The resulting depression of the valve stem 122 generates a stream of bubbles of compressed air flowing out of the front of the ram 112, which in turn informs the operator of the system that the plug 40 has been expanded into place within its respective flowport 11.

Near its top portion, the hydraulic ram 112 includes a retaining bar 123 having an arcuate inner edge 124 that is complementary in shape to the outer edge of the retaining ring 44 of the plug 40. Just above the retaining bar 123 are a pair of fluid lines 125a, 125b for conducting compressed air to the valve stem 122, and pressurized hydraulic fluid to the pistons 118 and 119. Disposed to one side of the top end of the ram 112 is a slide bar 126 which extends through a slot 127 in the frame 116. This slide bar 126 is mounted onto a long-handled tool 128, while the frame 116 of the tool 110 is connected to a second long-handled tool 129. The foregoing configuration allows the operator of the tool 110 to move the ram 112 up and down within the frame 116 by holding the first long-handled tool 129 steady while reciprocating the ram-connected, long-handled tool 128. At the bottom of the hydraulic ram 112 are a pair of symmetrically arranged ramps 130a, 130b disposed at approximately a 45° angle with respect to the axis of the frame 116. Each of these ramps 130a, 130b has approximately an Lshaped cross-section. As will be explained in more detail presently, the 45° disposition of the ramps 130a, 130b allows them to wedgingly engage the top of the cradle assembly 114 when the hydraulic ram 112 is slid downwardly within the frame 116 in order to displaceably push the cradle assembly 114 forward and out of the front of the frame 116.

Generally, the cradle assembly 114 is formed from an inner cradle 135 that is slidably connected on its sides to an outer cradle 136. The inner edge of the inner cradle 135 is approximately U-shaped, and is formed from a pair of parallel inner flanges 137a, 137b on its sides, and an arcuate inner edge 138 at its bottom. The inner flanges 137a, 137b are receivable within the previously described grooves 105a, 105b present on opposite sides of the retaining ring 44 of the plug 40. The shape of the arcuate inner edge 138 is approximately complementary to the outer edge of the retaining ring 44. The outer edge of the inner cradle 135 is also approximately U-shaped, and includes a pair of outer flanges 139a, 139b which are slidably received within a pair of inner slots 141a, 141b disposed on opposite sides of the outer cradle 136. The bottom edge of the inner cradle 135 includes a pair of rollers 143a, 143b which allows the inner cradle 135 to roll forward and backward across the bottommost member of the frame 116.

The outer sides of the outer cradle 136 are pivotally connected to the sides of the frame 116 by a pair of opposing parallelogram linkages indicated generally at 146a, 146b. Each of these linkages is formed from an inner pivot arm 148a, 148b and an outer pivot arm 150a, 150b. As may best be seen in FIGS. 7A and 7B, pivot arms 148a, 148b and 150a, 150b are of equal length, and overlie one another. Each of the inner pivot arms 148a, 148b includes an upper pivot joint 152a, 152b that connects the top end of the arm to an outer side of the outer cradle 136, as well as a lower pivot joint 153a, 153b that connects the lower end of the inner arm to a side of the frame 116. Similarly, each of the outer pivot arms 150a, 150b includes an upper pivot joint 155a, 155b and a lower pivot joint 156a, 156b that connects the upper and lower ends of these arms to the outer cradle 136 and sides of the frame 116, albeit at points which are vertically displaced from the upper and lower pivot joints 152a, 152b and 153a, 153b. Finally, each of the upper pivot joints 155a, 155b is connected to a side of the frame 116 by means of a spring-biased hook 158a, 158b. The purpose of the spring-biased hooks 158a, 158b is to withdraw the cradle assembly 154 from the position shown in FIG. 7B to the position shown in FIG. 7A when the compact hydraulic ram 112 is slid upwardly back into the position shown in FIG. 6A.

While the cradle assembly 114 has been described with specific reference to a parallelogram-type linkage, an equivalent movement could be obtained any number of ways. For example, the vertically arranged arms of the linkages 146a, 146b could be replaced with horizontally arranged pivoting arms that operate between the cradle 136 and the frame 116 in a "carpenter's ruler" configuration. Additionally, guide rails could be placed on the sides of the cradle 135 to ensure a smooth to and fro movement between the cradle assembly 114 and frame 116. Such a configuration would advantageously eliminate the need for inner and outer cradles 135 and 136, and allow these parts to be consolidated into a single U-shaped cradle.

The method of the invention is particularly well suited for plugging the flowports 11 of core barrels 7 having an outside portion which is chamfered 37, and an inside, cylindrically shaped portion 39 having a relatively small diameter (i.e., on the order of 1.25 inches). In the first step of this method, a particular chamfered plug 11 is selected for plugging. Both the maximum diameter and the axial extent of the chamfered portion 37 of the flowport 11 are next remotely ascertained by means of a television monitor. An appropriately dimensioned plug 40 is next assembled by choosing a retaining ring 44 whose annular, wall-engaging face 102 is large enough to engage the outside surface of the core barrel 7 as is illustrated in FIGS. 4C and 5 when the plug 40 is inserted into the flowport 11. Additionally, the depth D1 of the retaining ledge 104 is chosen to accommodate the depth L3, L4 of the chamfered portion 37 of the flowport 11 so that a sufficient amount of the distal end 48 of the cylindrical shell 46 of the plug body 42 engages the non-chamfered portion 39 of the flowport 11 after installation.

Once the appropriately dimensioned ring 44 has been chosen, the plug 40 is assembled by inserting the distal end 48 of the shell 46 completely through the circular opening 100 of the ring 44, and creating the detents 107a, 107b by drilling the shallow bores 109a, 109b and bending inwardly the resulting thin flanges of metal adjacent to the opening 100.

In the next step of the method, the assembled plug 40 is detachably mounted onto the installation tool 110 by manually pulling the cradle assembly 114 toward the front of the frame 116, and sliding the parallel grooves 105a, 105b of the retaining ring 44 over the parallel pair of flanges 137a, 137b of the inner cradle 135. Once this has been accomplished, the operator releases the cradle assembly 114, which in turn allows the spring-biased hooks 158a, 158b to pull the retaining ring 44 of the plug 40 into the frame 116 and under the compact hydraulic ram 112 in the position shown in FIG. 6A. Long-handled tools 128 and 129 are next mounted on the frame 116 and the slide bar 126 of the installation tool 110.

The plug 40 and installation tool 110 are then manually lowered in the annular space between the core barrel 7, and the thermal shield 9. The telescopic engagement between the retaining ring 44 and the cylindrical shell 46 of the plug body 42 allows the plug 40 to assume the contracted configuration shown in FIG. 4A. The operator then aligns the distal end 48 of the plug 40 with the chamfered portion 37 of a selected flowport 11, and partially inserts it therein. He then completely inserts the distal end 40 of the plug into the flowport 11 by holding the frame 116 steady while sliding the compact hydraulic ram 112 downwardly within the frame 116 with the long-handled tool 128. The ramps 130a, 130b extending from the bottom of the compact hydraulic ram 112 wedgingly engage the top ends of the inner and outer pivot arms 148a, 150a, and 148b, 150b, thereby rocking the entire carriage assembly 114 forward. When the bottom edge of the body 120 of the ram 112 finally engages the bottom of the frame 116, the retaining ring 44 becomes captured between the arcuate inner edge 124 of the retaining bar 123 mounted on the front face of the ram 112, and the arcuate inner edge 138 of the inner cradle 135. At the same time, the front telescoping piston 118 becomes concentrically aligned with the proximal face of the tapered mandrel 47 (see FIG. 7B).

In the next step of the method, pressurized hydraulic fluid is admitted through fluid line 125b in order to extend the front and rear telescoping pistons 118 and 119 into the positions illustrated in phantom in FIG. 6B. The rear piston 119 reacts against the thermal shield 9, while the front piston 118 reacts against the distal face of the tapered mandrel 47, thereby pushing it downwardly into the position illustrated in FIG. 4C and FIG. 5. When the tapered mandrel 47 is seated into its lowermost positions with respect to the cylindrical shell 46 of the plug 40, the head 97 of the indicator pin 86 pops up in the manner previously described, and strikes the valve stem 122 concentrically disposed within the front telescoping piston 118. The resulting air bubbles provide a positive visual signal to the operator that the plug 40 has been expanded in place within the core barrel 7.

In the last steps of the method, the flow of pressurized hydraulic fluid through line 125b is ceased, and the front and rear telescoping pistons 118, 119 withdrawn back into the body 120 of the ram 112. The operator then pulls the ram 112 upwardly back into the position illustrated in FIG. 7A. The retaining ring 44 is finally released from the installation tool 110 by pulling the frame away from the mounted plug 40 by means of the long-handled tool 129 connected to the frame 116, thereby overcoming the force of the spring-biased hooks 158a, 158b and rocking the cradle assembly 114 out of the frame 116. The retaining ring 44 may then be easily slid out of the installation tool 110 by merely pushing the frame 116 downwardly so that the inner flanges 137a, 137b slide out of the grooves 105a, 105b.

The method is repeated until all of the flowports 11 of the core barrel 7 are plugged.

We claim:

1. A method for plugging a port in the wall of a vessel wherein access to said port is impeded by a wall that is spaced adjacent to the port a distance L by means of a plug having a plug body including a shell and a tapered mandrel disposed therein that is insertable within the port and expandible into sealing engagement therewith when said mandrel is moved along said shell, and a retaining ring that is telescopically connected to the plug body for engaging the outer surface of the vessel that surrounds the port and for limiting the extent to which the plug body is inserted into the port, comprising the steps of:

(a) contracting the length of the plug to a distance less than L by sliding the retaining ring toward the middle of the plug body;
   (b) delivering the contracted plug to a port and inserting the plug body into the port until further insertion is prevented by the retaining ring, and
   (c) expanding the plug body into sealing engagement with the port by moving said tapered mandrel along said shell by means of a hydraulic ram means.

2. An improved plugging system for remotely plugging ports in the walls of a core barrel of a pressurized water nuclear reactor, each port including a chamfered portion that leads to the outside of the barrel, and a non-chamfered portion that leads into the inside of the barrel, wherein the diameters of the chamfered portions of different ports are different but the diameters of the non-chamfered portions are substantially the same, and wherein a thermal shield circumscribes the outside surface of the barrel, and impedes access to the ports, comprising:

(a) a plurality of plugs insertable within ports, including
      (i) a plurality of plug bodies for plugging said ports having substantially the same diameters, wherein each plug body has a distal end that is insertable into the non-chamfered portion of one of the ports and which is radially expandable into sealing engagement therewith, and a proximal end having a stop flange,
      (ii) a plurality of retaining rings for limiting the extend to which said plug bodies may be inserted into said ports, said rings having different diameters for accommodating the different diameters of the non-chamfered portions of the ports, wherein each retaining ring includes a concentrically disposed opening that slidably receives the distal end of one of the plug bodies but which will not conduct said stop flange on the proximal end of the plug body so that each of said rings may be slid toward the middle of its respective plug body to minimize the over-all length of the plug during delivery of the plug to a port to facilitate the installation of the plug in a port, and wherein each retaining ring engages the outside surface of the barrel that surrounds a chamfered portion when its respective plug body is inserted into a port, and
   (b) means for expanding the plug bodies into sealing engagement with the non-chamfered portion of their respective ports.

3. The system of claim 2, wherein each retaining ring has a tapered shoulder that is insertable into the chamfered portion of its respective port and is substantially complementary in shape therewith.

4. The system of claim 2, wherein each of said plug bodies includes a cylindrical shell, and a tapered mandrel disposed therein for wedgingly pushing the outside surface of the shell into sealingless engagement with the non-chamfered portion of the port.

5. The system of claim 4, wherein said means for expanding the plug bodies includes a piston for pushing the tapered mandrel of each plug body into its shell.

6. The system of claim 2, wherein each plug body includes a locking mechanism for preventing overexpansion of the plug body, and said mechanism includes means for indicating when said plug body has been sufficiently expanded within the port to plug said port.

7. The system of claim 2, wherein each plug body is circumscribed by at least one sealing rib on its distal end which sealingly engages the non-chamfered portion of the port when the plug body is expanded.

8. The system of claim 2, wherein each plug body includes a resilient retainer means on its distal end for retaining the plug body in the non-chamfered portion of the port prior to the expansion thereof.

9. The system of claim 2, wherein each retaining ring includes an outer flange that engages the outside wall of the core barrel when its respective plug body is expanded within its respective port.

10. The system of claim 9, wherein said outer flange includes one handling groove for facilitating the handling of the plug by a handling tool.

11. An improved plugging system for remotely plugging ports in the wall of a vessel, wherein each port includes a chamfered portion that leads to the outer surface of the vessel, as well as a non-chamfered portion that leads to the interior of the vessel wherein said chamfered portions of at least two different ports are of different sizes, and wherein access is limited to the chamfered portions of said ports by an opposing wall, comprising:
(a) a plug insertable through the chamfered portion of a selected port that includes
(i) a plug body having a distal end that is insertable into the non-chamfered portion of the port and which is radially expandible into sealing engagement therewith, and
(ii) a selected one of a plurality of different size retaining rings circumscribing the plug body and telescopically connected thereto for engaging the surface of the vessel wall surrounding the chamfered end of the port and limiting the extent to which the plug body is inserted into the non-chamfered portion of the port,
wherein the size of the retaining ring is selected on the basis of the size of the chamfered portion of the port, and the retaining ring may be slid toward the middle of the plug body to minimize the over-all length of the plug prior to the insertion of the plug body into the port and to thereby facilitate the installation of the plug into the port, and
(b) means for expanding the plug body into sealing engagement with the non-chamfered portion of the port.

12. An improved plugging system for remotely plugging ports in the wall of a vessel, wherein each port includes a chamfered portion that leads to the outer surface of the vessel, as well as a non-chamfered portion that leads to the interior of the vessel, and wherein access is limited to the chamfered portions of said ports by an opposing wall, comprising:
(a) a plug insertable through the chamfered portion of a selected port that includes
(i) a plug body for plugging the nonchamfered portion of a port having a distal end that is insertable into said non-chamfered portion, wherein said plug body includes a cylindrical shell, and a tapered mandrel disposed therein for wedgingly expanding the distal end into sealing engagement with the non-chamfered portion of the port, and
(ii) a retaining ring circumscribing the plug body and telescopically connected thereto for engaging the surface of the vessel wall surrounding the chamfered end of the port and limiting the extend to which the plug body is inserted into the non-chamfered portion of the port,
wherein the retaining ring may be slid toward the middle of the plug body to minimize the over-all length of the plug during delivery of the plug to a port prior to the insertion of the plug body into the port to thereby facilitate the installation of the plug into the port, and
(b) expansion means including a hydraulic ram having a piston for pushing said tapered mandrel into said shell for expanding the plug body into sealing engagement with the non-chamfered portion of the port after said plug body is inserted into the port.

13. The system of claim 12, wherein the chamfers of the ports have different diameters, and further including a plurality of retaining rings of different diameters for accommodating said different sized chamfers, and wherein each of the retaining rings is slidably installable around the distal end of the plug body.

14. The system of claim 12, wherein the retaining ring is slidably installable around the distal end of the plug body.

15. The system of claim 12, wherein the retaining ring has a tapered shoulder that is insertable into the chamfered portion of the port and substantially complementary in shape therewith.

16. The system of claim 12, wherein the proximal end of the plug body has a stop flange for preventing the retaining ring from being slide off the proximal end of the plug body.

17. The system of claim 12, wherein the plug body includes a locking mechanism for preventing overexpansion of the plug body, and said mechanism includes means for indicating when said plug body has been sufficiently expanded within the port to plug said port.

18. The system of claim 12, wherein said plug body is circumscribed by at least one sealing rib on its distal end which sealingly engages the non-chamfered portion of the port when the plug body is expanded.

19. The system of claim 12, wherein said plug body includes a resilient retainer means on its distal end for retaining the plug body in the non-chamfered portion of the port prior to the expansion thereof.

* * * * *